(12) United States Patent
Bae et al.

(10) Patent No.: US 11,326,814 B2
(45) Date of Patent: May 10, 2022

(54) LINEAR COMPRESSOR

(71) Applicant: LG Electronics Inc., Seoul (KR)

(72) Inventors: Sangeun Bae, Seoul (KR); Sangmin Lee, Seoul (KR); Hyunsoo Kim, Seoul (KR); Dongkyun Ha, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/996,612

(22) Filed: Aug. 18, 2020

(65) Prior Publication Data

US 2021/0088039 A1 Mar. 25, 2021

(30) Foreign Application Priority Data

Sep. 20, 2019 (KR) ........................ 10-2019-0116387

(51) Int. Cl.
*F25B 31/02* (2006.01)
*F04B 39/00* (2006.01)
(Continued)

(52) U.S. Cl.
CPC ........ *F25B 31/023* (2013.01); *F04B 39/0027* (2013.01); *F04B 53/1035* (2013.01);
(Continued)

(58) Field of Classification Search
CPC .... F25B 31/023; F04B 53/1007; F04B 35/04; F04B 53/1035; F04B 39/0027; F04B 39/0005; F04B 39/121; F04B 53/102; F04B 49/22; F04B 39/123; F04B 17/04; F04B 15/02; F04B 35/045; F04B 39/0044; F16K 15/025; F16K 15/021; F16K 15/023; F05B 2260/964
See application file for complete search history.

(56) References Cited

U.S. PATENT DOCUMENTS

2017/0298913 A1* 10/2017 Kim .......................... F04B 9/06
2018/0306337 A1* 10/2018 Blersch .................. F16J 15/064

FOREIGN PATENT DOCUMENTS

EP 2975267 1/2016
EP 3242019 11/2017
(Continued)

OTHER PUBLICATIONS

KR20160010999 translation (Year: 2021).*
(Continued)

*Primary Examiner* — Kenneth J Hansen
*Assistant Examiner* — David N Brandt
(74) *Attorney, Agent, or Firm* — Fish & Richardson P.C.

(57) ABSTRACT

A linear compressor includes a cylinder, a discharge valve, a valve spring pressing the discharge valve to close one side of the cylinder, and a spring support portion providing a support point for the valve spring to press the discharge valve. The valve spring includes a first spring arm whose center is connected to the discharge valve and extending spirally, a second spring arm spaced apart from the first spring arm by a predetermined distance with respect to an axial direction of the cylinder and extending spirally toward an outer portion according to a shape of the first spring arm, and a rubber damper connecting the first spring arm and the second spring arm and fixing relative positions of the first spring arm and the second spring arm.

23 Claims, 9 Drawing Sheets

(a)

(b)

(51) Int. Cl.
  *F04B 53/10* (2006.01)
  *F16K 15/02* (2006.01)
  *F04B 17/04* (2006.01)
  *F04B 39/12* (2006.01)
  *F04B 49/22* (2006.01)
  *F04B 35/04* (2006.01)

(52) U.S. Cl.
  CPC .......... *F16K 15/021* (2013.01); *F16K 15/025* (2013.01); *F04B 17/04* (2013.01); *F04B 35/045* (2013.01); *F04B 39/123* (2013.01); *F04B 49/22* (2013.01); *F04B 53/102* (2013.01); *F16K 15/023* (2013.01)

(56) References Cited

FOREIGN PATENT DOCUMENTS

| EP | 3242020 | | 11/2017 | |
|----|---------|---|---------|---|
| KR | 20160009306 | | 1/2016 | |
| KR | 20160010999 | * | 1/2016 | ............. F04B 17/04 |
| KR | 20190105448 | | 9/2019 | |

OTHER PUBLICATIONS

Korean Office Action in Korean Appln. No. 10-2019-0116387, dated Aug. 12, 2020, 9 pages (with English translation).
EP extended European search report, in European Appln. No. 20192359.6, dated Oct. 21, 2020, 4 pages.

\* cited by examiner

LINEAR COMPRESSOR

CROSS-REFERENCE TO RELATED APPLICATIONS

This application claims the benefit of the Korean Patent Application No. 10-2019-0116387 filed on Sep. 20, 2019, which is hereby incorporated by reference as if fully set forth herein.

TECHNICAL FIELD

The present disclosure relates to a linear compressor utilized in various electronic devices.

BACKGROUND

A heat pump system refers to a system of circulating a refrigerant and transferring heat from a specific place to another place, which repeatedly performs compression, condensation, expansion, and evaporation on a refrigerant. To this end, the heat pump system includes a compressor, a condenser, an expansion valve, and an evaporator. A typical home appliance using such a heat pump system is a refrigerator or an air conditioner.

A main power source of refrigerant circulation of the heat pump system is a compressor, and the compressor may be classified into a reciprocating compressor, a rotary compressor, and a scroll compressor.

The reciprocating compressor is based on a scheme in which a compression space to or from which a working gas is sucked or discharged is formed between a piston and a cylinder and a refrigerant is compressed by causing the piston to perform a linear reciprocal motion in the cylinder. The rotary compressor is based on a scheme in which a compression space to or from which a working gas is sucked or discharged is formed between an eccentrically rotated roller and a cylinder and a refrigerant is compressed by causing the roller to be eccentrically rotated along an inner wall of the cylinder. The scroll compressor is based on a scheme in which a compression space to or from which a working gas is sucked or discharged is formed between an orbiting scroll and a fixed scroll and a refrigerant is compressed by causing the orbiting scroll to be rotated along the fixed scroll.

Recently, among the reciprocating compressors, in particular, a linear compressor having a structure simplified by directly connecting a piston to a drive motor which makes a reciprocating linear motion and minimizing mechanical loss due to motion switching has been actively developed.

Korean Patent Laid-open Publication No. 10-2016-0009306, a related art document, discloses a linear compressor and a refrigerator including the same.

The linear compressor includes a compressor body in a compressor casing and includes a body support (support device) for supporting the compressor body. The body support is provided at both ends of the compressor body along an axial direction of the compressor so that the compressor casing and the compressor body are not in direct contact with each other.

The compressor body includes a cylinder that compresses a refrigerant flowing from a suction portion and discharges the compressed refrigerant through a discharge portion, a piston that makes a reciprocating linear motion in the cylinder, and a motor assembly that provides driving force to the piston.

However, the related art has a problem in that vibration and noise occurring in the course of operation of the compressor body are transferred to the compressor casing of the compressor by the support device, causing vibration noise.

SUMMARY

An aspect of the present disclosure is directed to providing a linear compressor in which a compressor body is prevented from colliding with a shell and shell cover of the compressor during an operation of the compressor body.

Another aspect of the present disclosure is directed to providing a linear compressor in which a path along which vibration occurring in a compressor body during an operation of the compressor body is transferred to a shell of the compressor is blocked to reduce occurrence of noise.

Particular implementations described herein provide a linear compressor that includes a cylinder, a discharge valve, a valve spring, and a spring support portion. The cylinder may receive a piston and define a movement path for the piston. The discharge valve may be configured to open and close a side of the cylinder and define a compression space for a refrigerant with the piston based on the discharge valve closing the side of the cylinder. The valve spring may be configured to press the discharge valve to close the side of the cylinder. The spring support portion may be configured to support the valve spring. The spring support portion may include an outer circumferential surface that is coupled to a discharge cover, and an inner circumferential surface that is coupled to the outer portion of the valve spring. The valve spring may include a central portion, an outer portion, at least one first spring arm, at least one second spring arm, and a rubber damper. The central portion may be connected to the discharge valve. The outer portion may be spaced apart from the central portion and disposed radially from the central portion. The at least one first spring arm may spirally extend from the central portion. The at least one second spring arm may be spaced apart from the at least one first spring arm in an axial direction of the cylinder, may spirally extend from the outer portion, and may correspond to a shape of the at least one first spring arm. The rubber damper may connect the at least one first spring arm with the at least one second spring arm and may fix position of the at least one first spring arm relative to the at least one second spring arm.

In some implementations, the linear compressor may optionally include one or more of the following features. The at least one first spring arm may include a plurality of first spring arms that spirally extend from a plurality of first points at the central portion. The plurality of first points may be spaced equally from each other. The at least one first spring arm may include a plurality of first spring arms that spirally extend from at least three points at the central portion. The at least one second spring arm may overlap at least partially with the at least one first spring arm with respect to the axial direction of the cylinder. The at least one second spring arm may include a plurality of second spring arms that spirally extend from a plurality of second points at the outer portion. The plurality of second points may be spaced equally from each other. The plurality of second spring arms may be connected to each other and define a circle in the outer portion. The at least one second spring arm may be disposed to overlap at least one-third of a length of the at least one first spring arm that extends from the central portion. The rubber damper may have a spiral shape that is disposed along a shape of the at least one first spring arm from the central portion. The rubber damper may cover a section in which the at least one first spring arm and the at least one second spring arm overlap with each other with respect to the axial direction of the cylinder. The rubber damper may be dual injection molded with the at least one first spring arm and the at least one second spring arm. The spring support portion may include a recess at an outer circumferential surface of the spring support portion. The recess may be disposed to face the discharge cover and receive a rubber ring. The outer portion may be connected as a circle and be inserted into and coupled to an inner circumferential surface of the spring support portion. The rubber ring may contact the discharge cover. The outer circumferential surface of the spring support portion may be spaced apart from the discharge cover. The at least one second spring arm may be located on an outer side in the radial direction with respect to the central portion. A thickness of the rubber damper in the axial direction may be greater than a distance between the at least one first spring arm and the at least one second spring arm in the axial direction. The cylinder has a pipe shape. The spring support portion may have a ring shape. The spring support portion may provide a support point for the valve spring to press the discharge valve to close the side of the cylinder.

To achieve these and other advantages and in accordance with the purpose of the disclosure, as embodied and broadly described herein, there is provided a linear compressor including: a cylinder having a pipe shape, including a piston installed therein, and configured to provide a movement path of the piston; a discharge valve configured to open and close one side of the cylinder and to form a compression space of a refrigerant together with the piston; a valve spring having a central portion connected to the discharge valve, including a spring arm spirally extending from the central portion toward an outer portion, and configured to press the discharge valve to close one side of the cylinder; and a spring support portion having a ring shape, having an outer circumferential surface coupled to the discharge cover, having an inner circumferential surface coupled to the outer portion of the valve spring, and configured to provide a support point for the valve spring to press the discharge valve, wherein the valve spring includes: the central portion connected to the discharge valve; a first spring arm spirally extending from the central portion; an outer portion spaced apart from the central portion in a radial direction and disposed on an outer side with respect to the central portion; a second spring arm spaced apart from the first spring arm in an axial direction of the cylinder and spirally extending according to a shape of the first spring arm from the outer portion; and a rubber damper connecting the first spring arm and the second spring arm and configured to fix relative positions of the first spring arm and the second spring arm.

The first spring arm spirally may extend from a plurality of points forming equal intervals in the central portion.

The first spring arm may spirally extend from at least three points in the central portion.

At least a partial section of the second spring arm may overlap the first spring arm with respect to the axial direction of the cylinder.

The second spring arm may include a plurality of spring arms spirally extending from a plurality of points forming equal intervals in the outer portion, and the plurality of spring arms may all be connected to each other to form a circle in the outer portion.

The second spring arm may be disposed to overlap 3/1 or more a length of the first spring arm extending from the central portion.

The rubber damper may have a spiral shape formed along a shape of the first spring arm from the central portion and covers a section in which the first spring arm and the second spring arm overlap each other with respect to the axial direction of the cylinder.

The rubber damper may be formed by dual injection molding using the first spring arm and the second spring arm as insert materials.

A recess formed to be depressed may be provided on an outer circumferential surface of the spring support portion at a position facing the discharge cover, and a rubber ring may be disposed in the recess.

The outer portion connected as a circle may be inserted into and coupled to an inner circumferential surface of the spring support portion.

With a spring assembly coupled to the discharge cover, the rubber ring may be in contact with the discharge cover and an outer circumferential surface of the spring support portion may be spaced apart from the discharge cover.

The second spring arm may be located on an outer side in the radial direction with respect to the central portion.

A thickness of the rubber damper in the axial direction may be greater than a distance over which the first spring arm and the second spring arm may be spaced apart from each other in the axial direction.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Hereinafter, the embodiments of the present disclosure will be described with reference to the accompanying drawings, in which like numbers refer to like elements throughout although the embodiments are different, and a description of the like elements a first embodiment will be used for those of the different embodiment. In the following description, usage of suffixes such as 'module', 'part' or 'unit' used for referring to elements is given merely to facilitate explanation of the present disclosure, without having any significant meaning by itself. In describing the present disclosure, if a detailed explanation for a related known function or construction is considered to unnecessarily divert the gist of the present disclosure, such explanation has been omitted but would be understood by those skilled in the art. The accompanying drawings of the present disclosure aim to facilitate understanding of the present disclosure and should not be construed as limited to the accompanying drawings. Also, the present disclosure is not limited to a specific disclosed form, but includes all modifications, equivalents, and substitutions without departing from the scope and spirit of the present disclosure.

It will be understood that, although the terms first, second, etc. may be used herein to describe various elements, these elements should not be limited by these terms. These terms are only used to distinguish one element from another.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

As used herein, the singular forms "a", "an" and "the" are intended to include the plural forms as well, unless the context clearly indicates otherwise.

It will be further understood that the terms "comprises" "comprising," "includes" and/or "including" when used herein, specify the presence of stated features, integers, steps, operations, elements, and/or components, but do not preclude the presence or addition of one or more other features, steps, operations, elements, components, and/or groups thereof.

Figure 1:
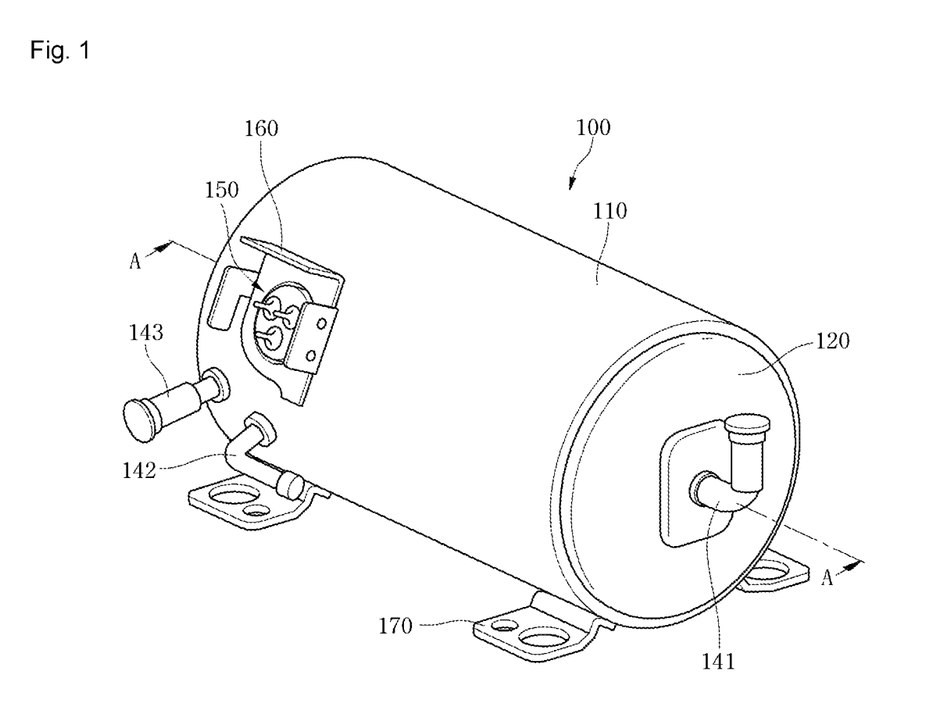
FIG. 1 is an external perspective view showing a configuration of a linear compressor according to an embodiment of the present disclosure.
Figure 2:
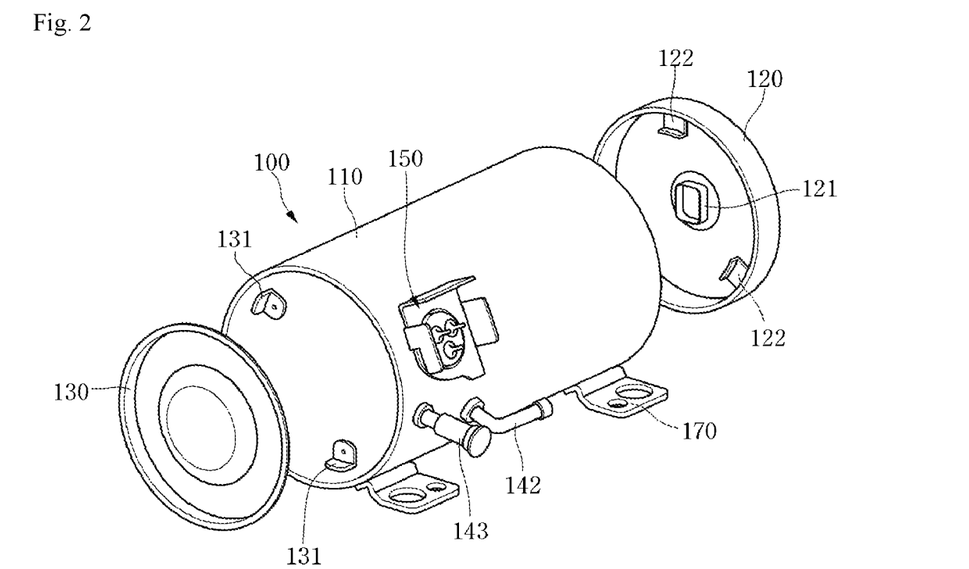
FIG. 2 is an exploded perspective view of a shell and a shell cover of a linear compressor according to an embodiment of the present disclosure.

FIG. 1 is an external perspective view showing a configuration of a linear compressor according to an embodiment of the present disclosure, and FIG. 2 is an exploded perspective view of a shell and a shell cover of a linear compressor according to an embodiment of the present disclosure.

Referring to FIGS. 1 and 2, the linear compressor 100 according to an embodiment of the present disclosure may include a shell 110 and shell covers 120 and 130 coupled to the shell 110.

In order to help understanding of the linear compressor 100 according to an embodiment of the present disclosure, the shell covers 120 and 130 and the shell 110 are separated, but in a broad sense, the shell covers 120 and 130 may be understood as components of the shell 110.

A leg 170 may be coupled to a lower side of the shell 110. The leg 170 may be coupled to a base of a product on which the linear compressor 100 is installed.

For example, the leg 170 may be installed in a base of the machine room of the refrigerator, or may be installed in a base of an outdoor unit of the air conditioner.

The shell 110 according to an embodiment may have a substantially cylindrical shape and may be disposed to lie in a horizontal direction or to lie in an axial direction. With reference to FIG. 1, the shell 110 may extend in a horizontal direction and may have a somewhat lower height in a radial direction. That is, since the linear compressor 100 may have a low height, when the linear compressor 100 is installed in the base of the machine of the refrigerator, a height of the machine room may be advantageously reduced.

In addition, a longitudinal central axis of the shell 110 matches a central axis of a compressor body, which will be described later, and the central axis of the compressor body matches a central axis of a cylinder and a piston configuring the compressor body.

A terminal 150 according to an embodiment may be disposed on an outer surface of the shell 110. The terminal 150 may transfer external power to a motor 1140 (see FIG. 3) of the linear compressor 100.

A bracket 160 according to an embodiment may be disposed outside the terminal 150. The bracket 160 may function to protect the terminal 150 from an external impact.

Opposing sides of the shell 110 according to an embodiment may be opened. The shell covers 120 and 130 may be coupled to opposing sides of the opened shell 110.

More specifically, the shell covers 120 and 130 may include a first shell cover 120 coupled to one side of the shell 110 and a second shell cover 130 coupled to the other side of the shell 110. An internal space of the shell 110 may be sealed by the first and second shell covers 120 and 130.

With reference to FIG. 1, the first shell cover 120 may be located on the right of the linear compressor 100, and the second shell cover 130 may be located on the left of the linear compressor 100.

In other words, the first and second shell covers 120 and 130 may be understood to be disposed to face each other. In addition, the first shell cover 120 may be located on a suction side of a refrigerant, and the second shell cover 130 may be located on a discharge side of the refrigerant.

The linear compressor 100 according to an embodiment of the present disclosure may further include a plurality of pipes 141, 142, and 143 provided on the shell 110 or the shell covers 120 and 130 and suck, discharge, or inject the refrigerator.

A plurality of pipes 141, 142, and 143 according to an embodiment may include a suction pipe 141 for supplying the refrigerant to the inside of the linear compressor 100, a discharge pipe 142 for discharging the compressed refrigerant from the linear compressor 100, and a process pipe 143 for replenishing a refrigerant to the linear compressor 100.

The suction pipe 141 according to an embodiment may be coupled to the first shell cover 120. The refrigerant may be sucked into the linear compressor 100 along an axial direction through the suction pipe 141.

The discharge pipe 142 according to an embodiment may be coupled to an outer circumferential surface of the shell 110. The refrigerant sucked through the suction pipe 141 may be compressed, while flowing in the axial direction. The compressed refrigerant may be discharged through the discharge pipe 142.

The process pipe 143 according to an embodiment may be coupled to an outer circumferential surface of the shell 110. The operator may inject the refrigerant into the linear compressor 100 through the process pipe 143.

The process pipe 143 may be coupled to the shell 110 at a height different from the discharge pipe 142 to avoid interference with the discharge pipe 142. The height may refer to a distance spaced from the leg 170 in a direction perpendicular to the leg (or a radial direction). Since the discharge pipe 142 and the process pipe 143 are coupled to the outer circumferential surface of the shell 110 at different heights, work convenience may be improved.

A cover support portion 121 may be provided on the inner surface of the first shell cover 120 according to an embodiment. A first support device 1230 (see FIG. 3), which will be described later, may be coupled to the cover support portion 121. The cover support portion 121 and the first support device 1230 may be understood as a device that supports a compressor body 1000 (see FIG. 3) of the linear compressor 100.

A stopper 122 may be provided on an inner surface of the first shell cover 120 according to an embodiment. The stopper 122 may prevent the body of the compressor, in particular, a motor 1140, from colliding with the shell 110 and being damaged due to vibration or shock generated during transportation of the linear compressor 100.

A spring fastening portion 131 may be provided on the inner circumferential surface of the shell 110 according to an embodiment. For example, the spring fastening portion 131 may be disposed at a position adjacent to the second shell cover 130. The spring fastening portion 131 may be coupled to a second support spring 1241 (see FIG. 3) of a second support device 1240 (see FIG. 3), which will be described later. By combining the spring fastening portion 131 and the second support device 1240, the body of the compressor may be stably supported inside the shell 110.

Figure 3:
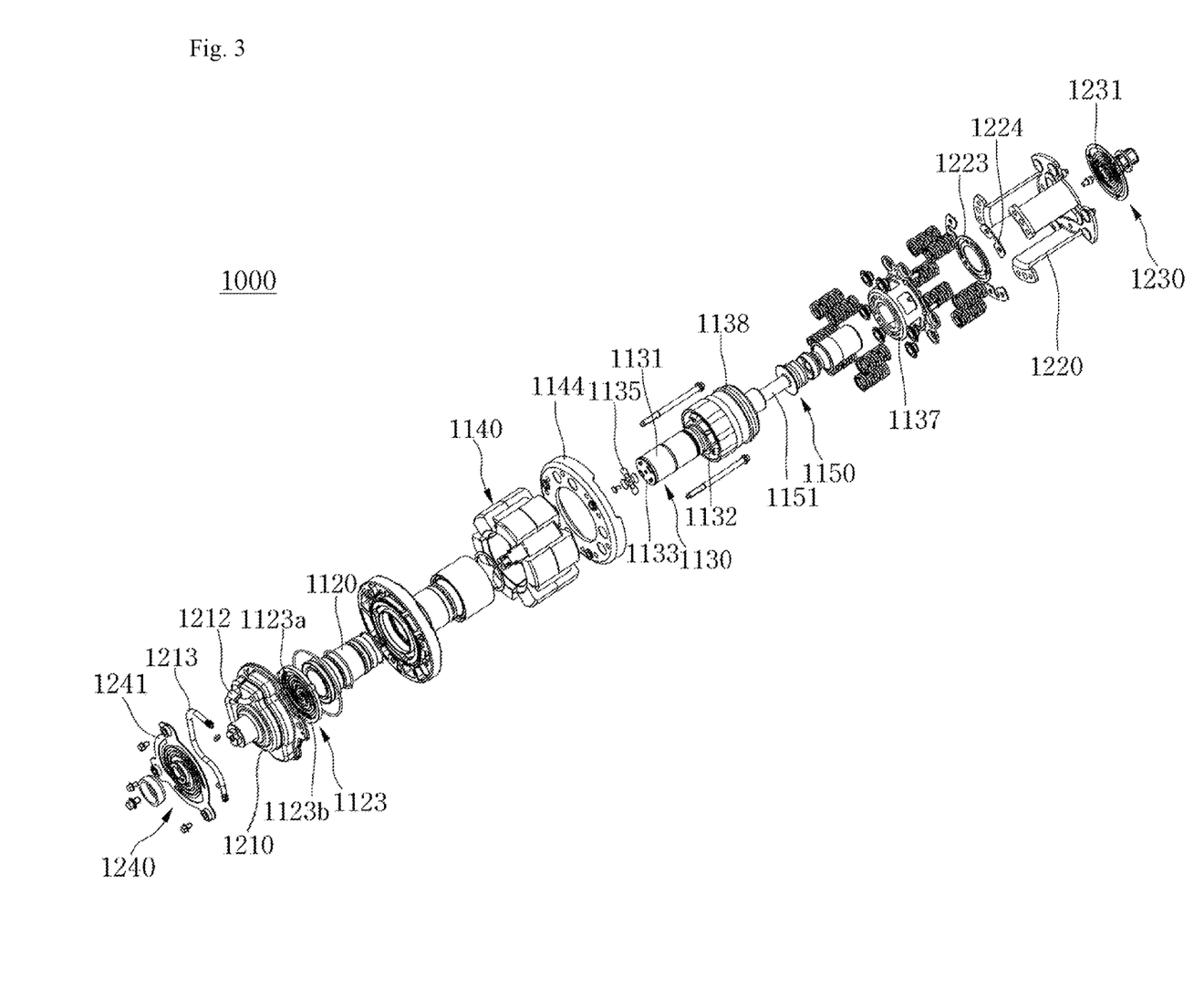
FIG. 3 is an exploded perspective view of internal components of a linear compressor according to an embodiment of the present disclosure.
Figure 4:
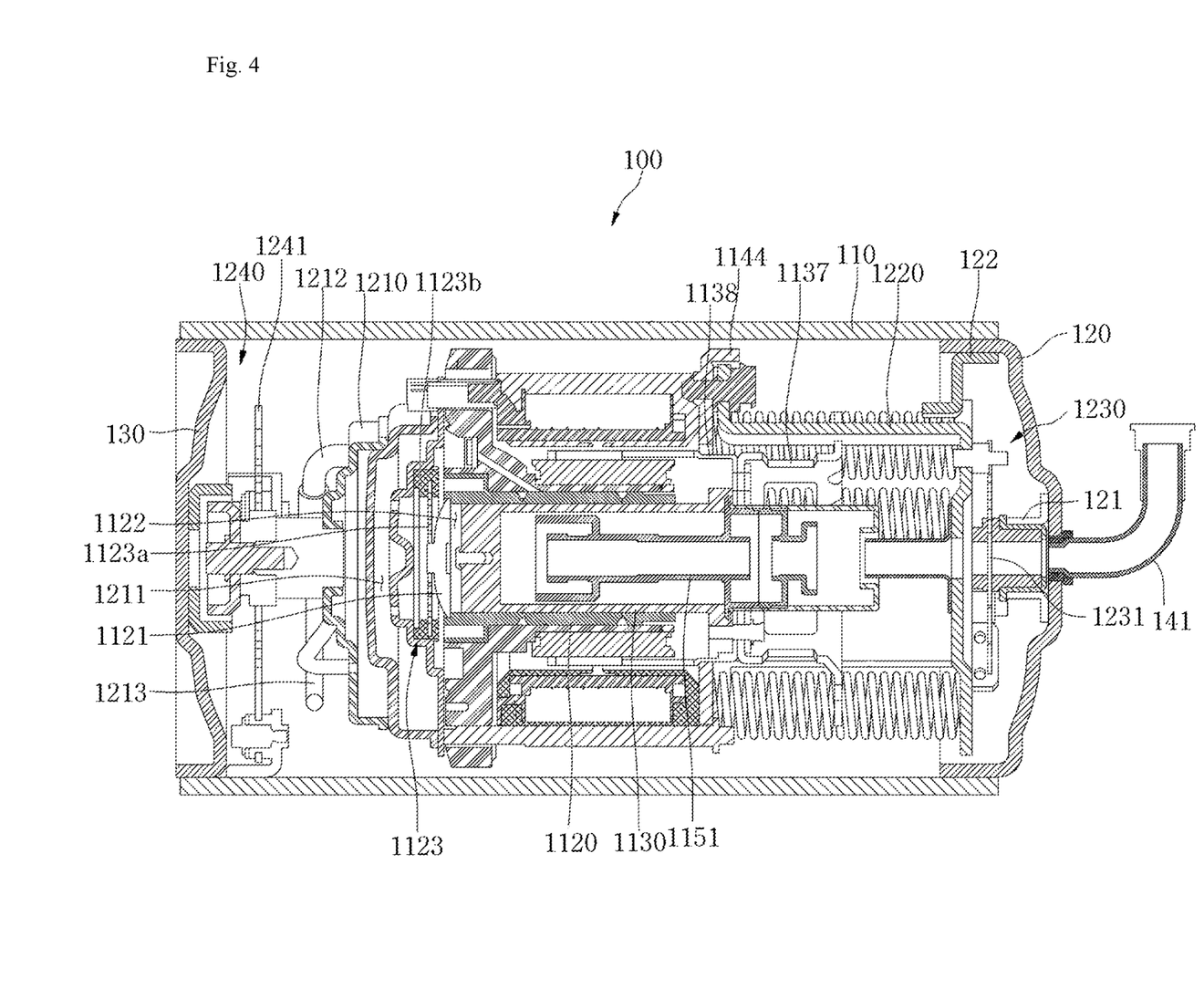
FIG. 4 is a cross-sectional view taken along line A-A of FIG. 1.

FIG. 3 is an exploded perspective view of internal components of the linear compressor according to the embodiment of the present disclosure, and FIG. 4 is a cross-sectional view taken along line A-A of FIG. 1.

In describing the linear compressor 100 according to various embodiments of the present disclosure, the linear compressor 100 may be described according to the following direction criteria for ease of understanding. However, this criteria are not absolute, and if one of the directions is changed, the rest may be changed correspondingly.

According to an embodiment, the term "axial direction" may refer to a direction in which the piston 1130 reciprocates, and may be understood as a left-right direction based on the illustrated state of FIG. 4. Among the "axial directions", a direction from the suction pipe 141 toward the compression space 1122, that is, a direction in which a refrigerant flows may be referred to as "front" (e.g., a left direction based on FIG. 4) and the opposite direction may be considered to be "rear" (e.g., a right direction based on FIG. 4). A "radial direction" is a direction perpendicular to the direction in which the piston 1130 reciprocates, and may be understood as an up-down direction based on the illustrated state of FIG. 4.

In addition, "downward" of the up-down direction may be understood as a direction in which a load of the compressor body 1000 works.

"Axis of the compressor body" may refer to an axial center line of the piston 1130. The axial center line of the piston 1130 may penetrate the first shell cover 120 and the second shell cover 130.

Referring to FIGS. 3 and 4, the linear compressor 100 according to an embodiment of the present disclosure may include the compressor body 1000 and one or more support devices 1230 and 1240 supporting the compressor body 1000 with respect to one or more of the shell 110 and the shell covers 120 and 130. The one or more support devices 1230 and 1240 may support the compressor body 1000 such that the compressor body 1000 is spaced apart from the shell 110.

The compressor body 1000 according to an embodiment may include a cylinder 1120 provided in the shell 110, a piston 1130 making a reciprocating linear motion in the cylinder 1120, and a motor 1140 providing a driving force to the piston 1130. When the motor 1140 is driven, the piston 1130 may reciprocate in the axial direction.

The piston 1130 according to an embodiment may include a piston body 1131 formed in a substantially cylindrical shape and a piston flange portion 1132 extending radially from the piston body 1131. The piston body 1131 may reciprocate within the cylinder 1120, and the piston flange portion 1132 may reciprocate outside the cylinder 1120.

The cylinder 1120 according to an embodiment may accommodate at least a portion of a first muffler 1151 and at least a portion of the piston body 1131.

A compression space 1122 in which a refrigerant is compressed by the piston 1130 may be formed in the cylinder 1120. A suction hole 1133 for introducing the refrigerant into the compression space 1122 is formed at a front portion of the piston body 1131, and a suction valve 1135 selectively opening the suction hole 1133 may be provided in front of the suction hole 1133.

A discharge cover 1210 forming a discharge space 1211 of the refrigerant discharged from the compression space 1122 and discharge valve assemblies 1121 and 1123 coupled to the discharge cover 1210 and selectively discharging the refrigerant compressed in the compression space 1122 may be provided on a front side of the compression space 1122 according to an embodiment.

The discharge space 1211 may include a plurality of space portions partitioned by an inner wall of the discharge cover 1210. The plurality of space portions may be arranged in the front-rear direction and may communicate with each other. Details thereof will be described later.

The compressor body 1000 according to an embodiment may further include a cover pipe 1212 coupled to the discharge cover 1210 and discharging the refrigerant flowing in the discharge space 1211 of the discharge cover 1210. In an example, the cover pipe 1212 may be formed of a metal.

The compressor body 1000 may further include a loop pipe 1213 coupled to the cover pipe 1212 and transferring the refrigerant flowing through the cover pipe 1212 to the discharge pipe 142. One side of the loop pipe 1213 may be coupled to the cover pipe 1212, and the other side may be coupled to the discharge pipe 142.

The loop pipe 1213 according to an embodiment is formed of a flexible material. The loop pipe 1213 may roundly extend along an inner circumferential surface of the shell 110 from the cover pipe 1212 and coupled to the discharge pipe 142. In an example, the loop pipe 1213 may be disposed in a wound form.

The compressor body 1000 according to an embodiment may further include a supporter 1137 supporting the piston 1130. The supporter 1137 may be coupled to the rear side of the piston 1130 and disposed to allow a muffler 1150 to penetrate. The piston flange portion 1132, a magnet frame 1138, and the supporter 1137 may be fastened by a fastening member.

A balance weight 1223 may be coupled to the supporter 1137 according to an embodiment. A weight of the balance weight 1223 may be determined based on an operating frequency range of the compressor body 1000.

The compressor body 1000 according to an embodiment may further include a rear cover 1220 coupled to the stator cover 1144 and extending rearward. In detail, the rear cover 1220 may be coupled to the rear side of the stator cover 1144.

A spacer 1224 may be interposed between the rear cover 1220 and a rear surface of the stator cover 1144. A distance from the stator cover 1144 to a rear end of the rear cover 1220 may be determined by adjusting a thickness of the spacer 1224. Further, the rear cover 1220 may be spring-supported by the supporter 1137.

The one or more support devices 1230 and 1240 may include a suction side support device 1230 coupled to one side of the compressor body 100. The suction side support device 1230 may be located at a portion where the refrigerant is sucked in the compressor body 1000.

The one or more support devices 1230 and 1240 may include a discharge side support device 1240 coupled to the other side of the compressor body 1000. The discharge side support device 1240 may be located at a portion where the refrigerant is discharged in the compressor body 1000.

Axial vibration and radial vibration of the compressor body 1000 may be absorbed by the suction side and discharge side support devices 1230 and 1240 according to an embodiment, so that the compressor body 1000 may be prevented from directly colliding with the shell 110 or the shell covers 120 and 130.

FIG. 5A is a cross-sectional view showing a state in which the discharge valve 1121 hermetically closes the cylinder 1120 according to an embodiment of the present disclosure, and FIG. 5B is a cross-sectional view showing a state in which the discharge valve 1121 opens the cylinder 1120 according to an embodiment of the present disclosure.

Referring to FIGS. 5A and 5B, the compression space 1122 of the linear compressor 100 according to an embodiment of the present disclosure may be formed through the cylinder 1120, the piston 1130, and the discharge valve 1121.

Among them, the discharge valve 1121 may serve to discharge the refrigerant when the refrigerant introduced into the compression space is compressed to a predetermined pressure or higher. The discharge valve 1121 may be provided with an elastic force through a spring assembly 300 disposed between the discharge cover 1210 and the discharge valve 1121, and open or close one side of the cylinder 1120 based on the provided elastic force.

Figure 6:
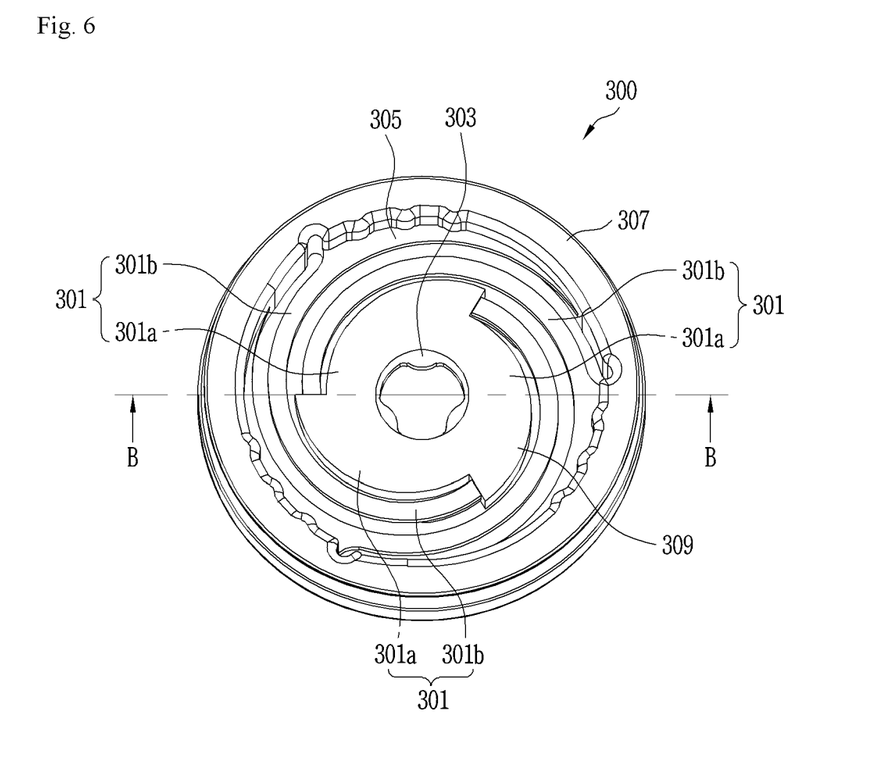
FIG. 6 is a view showing a spring assembly according to an embodiment of the present disclosure.

The spring assembly 300 according to an embodiment of the present disclosure may include a valve spring 301 (see FIG. 6), a spring support portion 307 (see FIG. 6) and a rubber damper 309 (see FIG. 6). The valve spring 301 may press the discharge valve 1121 so that the discharge valve 1121 maintains a state of closing one open side of the cylinder 1120.

An operation of the discharge valve 1121 and the spring assembly 300 according to an embodiment is as follows. While the piston 1130 makes a reciprocating linear motion inside the cylinder 1120, the refrigerant is compressed in the compression space 1122, and when pressure of the compression space 1122 gradually increases, a force pushing out the discharge valve 1121 may increase. When the pressure of the refrigerant is greater than the elastic force of the valve spring 301, the discharge valve 1121 may be pushed axially to open one side of the cylinder 1120 and the refrigerant may be discharged from the cylinder 1120. When the refrigerant is discharged and the pressure of the compression space 1122 is lowered, the discharge valve 1121 may again close one side of the cylinder 1120 by the elastic force of the valve spring 301. The linear compressor 100 may compress the refrigerant to a high pressure by repeating the above process.

In the process as described above, the discharge valve 1121 repeatedly opens and closes one side of the cylinder 1120, and vibration and noise may occur as the cylinder 1120 and the discharge valve 1121 collide with each other in the repeated opening and closing process. The vibration and noise that occur may be transferred through the connected components and finally transferred to the shell 110 (see FIG. 3) and the shell cover 130 (see FIG. 3) of the linear compressor 100 (see FIG. 3) so as to be recognized outside.

Specifically, referring to a transmission path of noise, the vibration and noise that occur due to the collision of the discharge valve 1121 and the cylinder 1120 may be transferred to the valve spring 301 connected to the discharge valve 1121, the spring support portion 307 for fixing the valve spring 301, and the discharge cover 1210 connected to the spring support portion 307.

In the linear compressor 100 according to an embodiment of the present disclosure, the valve spring 301, which is a component that is first connected to the discharge valve 1121, is physically separated and a structure for absorbing noise and vibration is disposed therebetween, thereby preventing transfer of vibration and noise.

FIG. 6 is a view showing the spring assembly 300 according to an embodiment of the present disclosure, and FIGS. 7A and 7B are exploded perspective view showing the spring assembly 300 at various angles according to an embodiment of the present disclosure.

The spring assembly 300 according to an embodiment may include a valve spring 301, a spring support portion 307 for connecting the valve spring 301 to the discharge cover 1210, and a rubber damper 309.

The valve spring 301 according to an embodiment may be similar to the valve spring 1123a illustrated in FIGS. 3 to 4. The valve spring 301 may have the form of a leaf spring. The valve spring 301 may be formed of a spring arm extending in a spiral shape and is understood to have a shape of a leaf spring as a whole.

The valve spring 301 may include a central portion 303 and an outer portion 305 and a spring arm spirally extending between the central portion 303 connected to the discharge valve 1121 and the outer portion 305.

Figure 5:
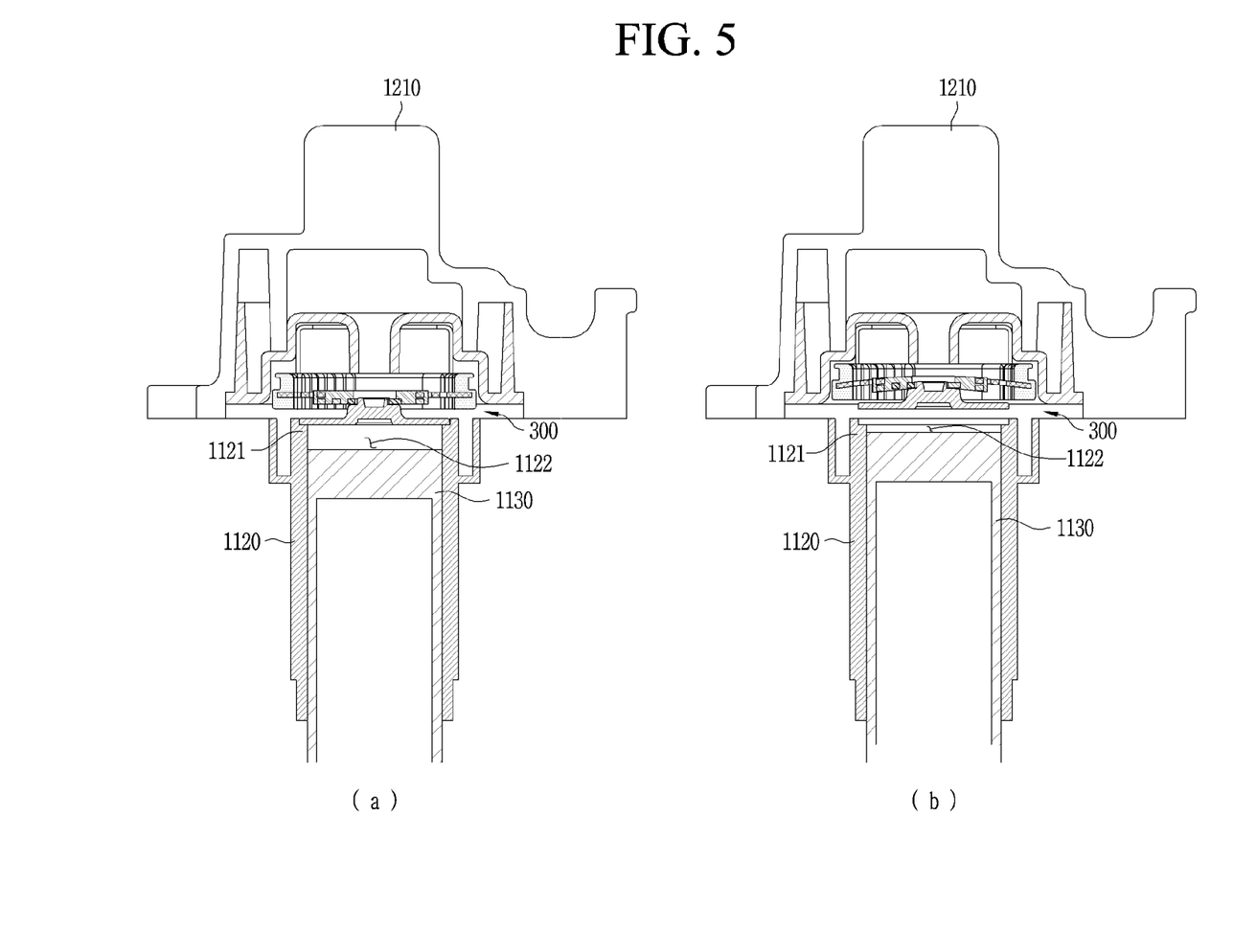
FIG. 5A is a cross-sectional view showing a state in which a discharge valve hermetically closes a cylinder according to an embodiment of the present disclosure.
FIG. 5B is a cross-sectional view showing a state in which the discharge valve opens a cylinder according to an embodiment of the present disclosure.

The valve spring 301 may include the central portion 303 connected to the discharge valve 1121 (see FIG. 5) and the outer portion 305 located and spaced apart from the central portion 303 radially to an outer side.

The center portion 303 may be located on an inner side of the outer portion 305 in the radial direction based on an axis of the compressor body 1000. In addition, the outer portion 305 may be disposed spaced apart from the central portion 303 in the axial direction of the compressor body 1000.

The valve spring 301 may further include a first spring arm 301a connected to the central portion 303 and a second spring arm 301b connected to the outer portion 305. The first spring arm 301a and the second spring arm 301b may configure the spring arm together. The first spring arm 301a and the second spring arm 301b are separated but may be operated as one valve spring 301 through the rubber damper 309 to be described later.

The first spring arm 301a according to an embodiment may have a shape extending spirally from the central portion 303. Specifically, the first spring arm 301a may be formed to be spirally extending toward an outer side from the central portion 303 in the radial direction.

In this case, the first spring arm 301a and the central portion 303 may be understood as one spring structure which is formed integrally.

A hole for coupling with the discharge valve 1121 may be provided at the central portion 303. The hole may have a conventional circular shape but may be formed in various other shapes to prevent the valve spring 301 and the discharge valve 1121 from relatively rotating.

For example, a hole having a polygonal shape such as a triangle, a square, or a pentagon may be formed, or may be formed in a shape similar to a triangle as shown in FIG. 6.

The first spring arm 301a may extend from the central portion 303 to surrounding the central portion 303. For example, the first spring arm 301a may be formed in a spiral shape, and accordingly, a portion of the first spring arm 301a may be spaced apart from the central portion 303.

A portion of the first spring arm 301a may be spaced apart from the central portion 303 by a predetermined distance in the radial direction.

The first spring arm 301a may extend from a plurality of points spaced apart from each other in a circumferential direction in the central portion 303. That is, the first spring arm 301a may include a plurality of spring arms extending from the plurality of points and spaced apart from each other.

Figure 7:
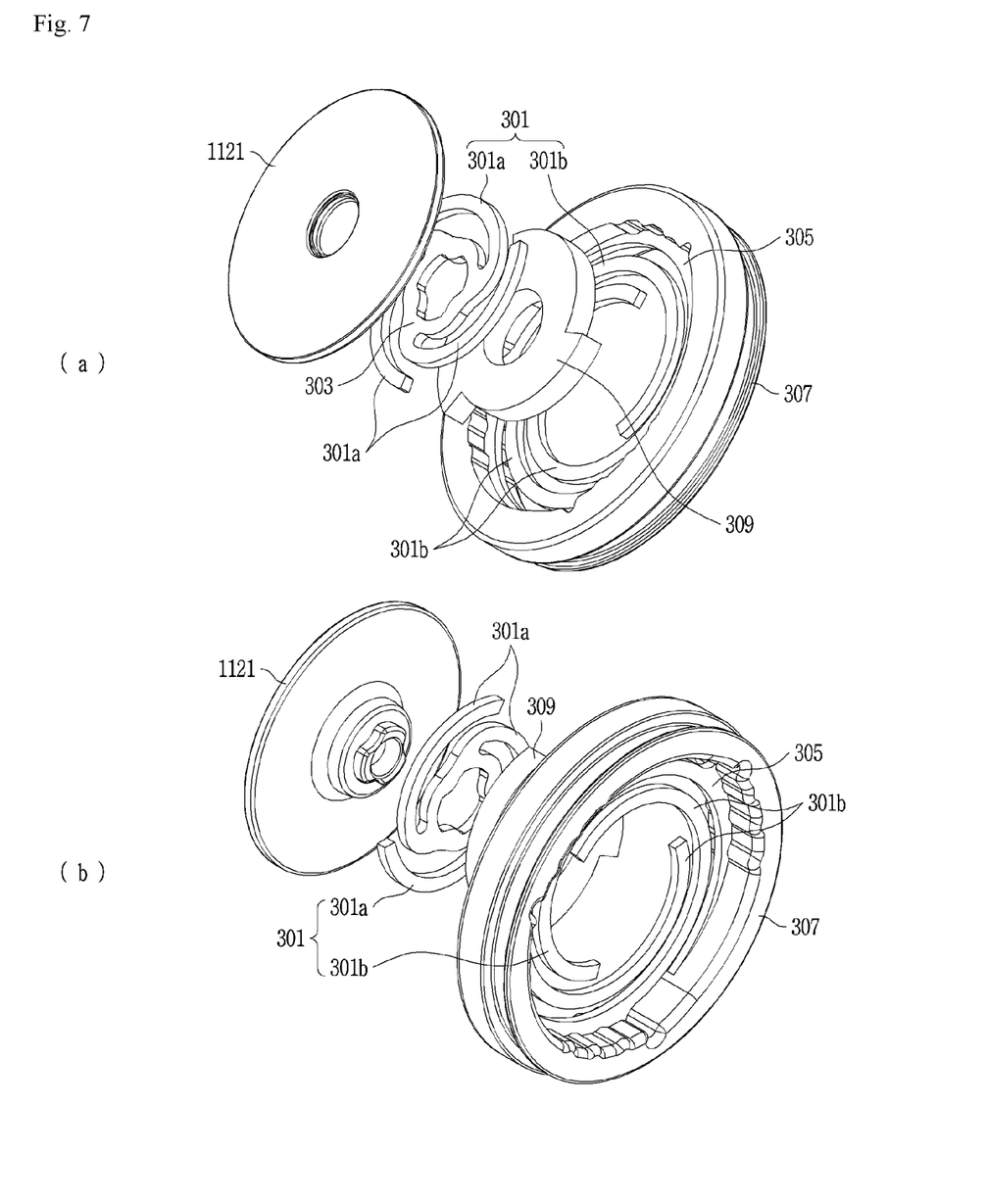
FIG. 7A is an exploded perspective view of a spring assembly according to an embodiment of the present disclosure.
FIG. 7B is an exploded perspective view of the spring assembly viewed from a different angle.

For example, as illustrated in FIGS. 6 to 7, the first spring arm 301a may extend from three points at equal intervals around the central portion 303. By forming a plurality of points extending at equal intervals, a uniform elastic force may be provided to the discharge valve 1121 regardless of direction in which the spring assembly 300 is mounted on the discharge cover 1210.

The first spring arm 301a may have one end connected to the central portion 303 and the other end located on an outer side radially from the one end. The other end may be located radially on an inner side radially with respect to the outer portion 305 based on the axis of the compressor body 1000. That is, it may be understood that the first spring arm 301a is located outside in the radial direction with respect to the outer portion 305.

The second spring arm 301b according to an embodiment may be disposed to be spaced apart from the first spring arm 301a by a predetermined distance with respect to the axial direction. For example, the second spring arm 301b may be disposed to be spaced apart from the first spring arm 301a in a direction away from the discharge valve 1121.

That is, the second spring arm 301b may be located on the opposite side of the discharge valve 1121 based on the first spring arm 301a.

As in the embodiment of the present disclosure, a transmission path of noise and vibration that occur in the discharge valve 1121 may be blocked by separately arranging the first spring arm 301a and the second spring arm 301b.

An interval between the first spring arm 301a and the second spring arm 301b may be changed in proportion to a thickness of the valve spring 301.

For example, in case of using a 1.5 t valve spring 301, the interval may be 0.7 mm.

The second spring arm 301b may be formed in a spiral shape according to the shape of the first spring arm 301a. Specifically, the second spring arm 301b may be formed in the same shape as at least a portion of the first spring arm 301a in a state of being spaced apart from the first spring arm 301a in the axial direction.

In addition, the second spring arm 301b may be connected to the outer portion 305 and may extend in a spiral shape from the outer portion 305 toward the central portion 303. That is, it may be understood that the second spring arm 301b extends in the spiral shape from the outer portion 305 toward the radially inner side.

The second spring arm 301b may be disposed on an outer side with respect to the central portion 303 in a radial direction.

Specifically, the second spring arm 301b may include one end connected to the outer portion 305 and the other end located radially on an inner side with respect to the one end, and the other end may be located on an outer side radially with respect to the central portion 303 based on the axis of the compressor body 1000.

The second spring arm 301b may extend in a shape (e.g., spiral shape) of covering the central portion 303, while assuming continuity according to the shape of the first spring arm 301a and maintaining a predetermined interval with the first spring arm 301a, and may be connected to each other at the outer portion 305 to form a circle.

The second spring arm 301b may extend from a plurality of points spaced apart from each other in a circumferential direction in the outer portion 305 toward the radially inner side. That is, the second spring arm 301b may include a plurality of spring arms extending from the plurality of points and spaced apart from each other.

In other words, it may be understood that the plurality of second spring arms 301b are connected as one by the outer portion 305. That is, since the plurality of second spring arms 301b are connected as one at the outer portion 305, a load transferred from the respective second spring arms 301b may be connected to each other and redistributed.

The rubber damper 309 according to an embodiment may fix relative positions of the first spring arm 301a and the second spring arm 301b and couple the first spring arm 301a and the second spring arm 301b to operate as one valve spring 301.

The rubber damper 309 may be formed of a material having rigidity sufficient to fix the relative positions of the first spring arm 301a and the second spring arm 301b and absorbing vibration and noise that may occur during the operation of the discharge valve 1121.

For example, the rubber damper 309 may be formed of a material such as fluorine rubber (FKM) having excellent heat resistance and abrasion resistance, and specifically, fluorine rubber of vinylidene fluoride (VDF) series may be used.

The rubber damper 309 may be integrally formed by injection-molding using the first spring arm 301a and the second spring arm 301b as insert materials.

An axial thickness of the rubber damper 309 may be greater than an interval over which the first spring arm 301a and the second spring arm 301b are spaced apart from each other in the axial direction.

The rubber damper 309 may be formed to substantially cover the entire first spring arm 301a and at least a portion of the second spring arm 301b, and thus a connection portion of the first spring arm 301a and the second spring arm 301b is not exposed.

Accordingly, a part of an outer portion of the rubber damper 309 may extend according to the shape of the first spring arm 301a in a circular-like shape as a whole. However, unlike a part of the first spring arm 301a, the rubber damper 309 may be formed to be connected to the central portion 303 without being spaced apart. When viewed from the upper side of FIG. 6, the rubber damper 309 may have a shape similar to a pinwheel or fan wings.

The spring support portion 307 according to an embodiment may be similar to the spring support portion 1123b shown in FIGS. 3 to 4. The spring support portion 307 may serve as a support point so that the valve spring 301 exerts an elastic force on the discharge valve 1121 and may also serve to connect the discharge cover 1210 and the valve spring 301.

The spring support portion 307 may be integrally formed with the outer portion 305 of the valve spring 301 through insert injection molding.

The spring support portion 307 may be provided in a ring shape and defines a receiving space at an inner side thereof. An outer circumferential surface of the spring support portion 307 may be located to face the discharge cover 1210, and the outer portion 305 may be coupled to an inner circumferential surface thereof.

As described above, in the linear compressor 100 according to an embodiment, in the process of compressing the refrigerant, the discharge valve 1121 repeatedly operates to open and close one side of the cylinder 1120. In this process, the cylinder 1120 and the discharge valve 1121 collide with each other and vibration and noise may occur. Moreover, if the linear compressor 100 becomes compact, while having the same performance, a reciprocating speed of the piston 1130 may increase in proportion to a reduced compression space 1122 and the number of opening and closing of the discharge valve 1121 may also increase. Accordingly, vibration and noise that occur in the discharge valve 1121 may increase and may be finally transferred to the shell 110 and the shell cover 130 of the linear compressor 100 through the connected components, so as to be recognized as vibration and noise outside.

Specifically, referring to the transmission path of the noise, vibration and noise that occur due to the collision of the discharge valve 1121 and the cylinder 1120 may be transferred to the valve spring 301 connected to the discharge valve 1121, the spring support portion 307 fixing the valve spring 301, and the discharge cover 1210 connected to the spring support portion 307.

In the linear compressor 100 according to an embodiment of the present disclosure, the first spring arm 301a, which is a component that is first connected to the discharge valve 1121, is physically separated into the first spring arm 301a and the second spring arm 301b to primarily block the transmission path of vibration and noise. In addition, the first spring arm 301a and the second spring arm 301b may be connected through the rubber damper 309 serving to attenuate vibration and noise to secondarily block the transmission path of vibration and noise. Through this, vibration and noise may be blocked at the position closest to the discharge valve 1121, which is a source of occurrence of vibration and noise, thereby blocking transfer of vibration and noise to outside. For example, among various noises that occur during the operation of the linear compressor 100, noise of 4 kHz to 5 kHz region may be improved.

Figure 8:
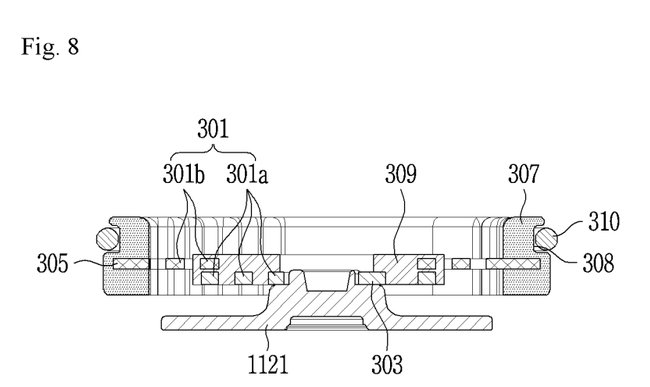
FIG. 8 is a cross-sectional view taken along line B-B of FIG. 6.

FIG. 8 is a cross-sectional view taken along line B-B of FIG. 6.

As shown in FIG. 8, the first spring arm 301a and the second spring arm 301b may be spaced apart from each other by a predetermined interval, as separate structures. Therefore, the transmission path of vibration and noise that occur in the discharge valve 1121 may be primarily blocked.

The interval between the first spring arm 301a and the second spring arm 301b may be changed in proportion to the thickness of the valve spring 301. The interval between the first spring arm 301a and the second spring arm 301b may be less than half the thickness of the first spring arm 301a or the second spring arm 301b. For example, in case of using a 1.5 t valve spring 301, the interval may be 0.7 mm.

However, the first spring arm 301a and the second spring arm 301b need to be connected as one to serve as one valve spring 301.

Therefore, the first spring arm 301a and the second spring arm 301b may be connected by the rubber damper 309 and formed of an elastic material capable of attenuating vibration and noise, thereby secondarily blocking the transmission path of vibration and noise. Since the vibration and noise blocking structure is disposed at a position closest to the discharge valve 1121, which is the source of the occurrence of vibration and noise, transmission of vibration and noise to the outside may be effectively blocked.

In addition, a groove 308 recessed in a direction toward the axis of the compressor body 1000 from an outer circumferential surface of the spring support portion 307 may be formed in the spring support portion 307.

The groove 308 may be formed in a circumferential direction on an outer circumferential surface of the spring support portion 307. For example, the groove 308 may have a ring shape.

A rubber ring 310 may be installed in the groove 308 to block direct contact of the spring support portion 307 and the discharge cover 1210. That is, in a state in which the spring assembly 300 is installed on the discharge cover 1210, the rubber ring 310 may be in contact with the discharge cover 1210 and the outer circumferential surface of the spring support portion 307 may be spaced apart from the discharge cover 1210. Accordingly, vibration and noise that may be transferred to the discharge cover 1210 may be blocked once again through an elastic material such as the rubber ring 310.

Figure 9:
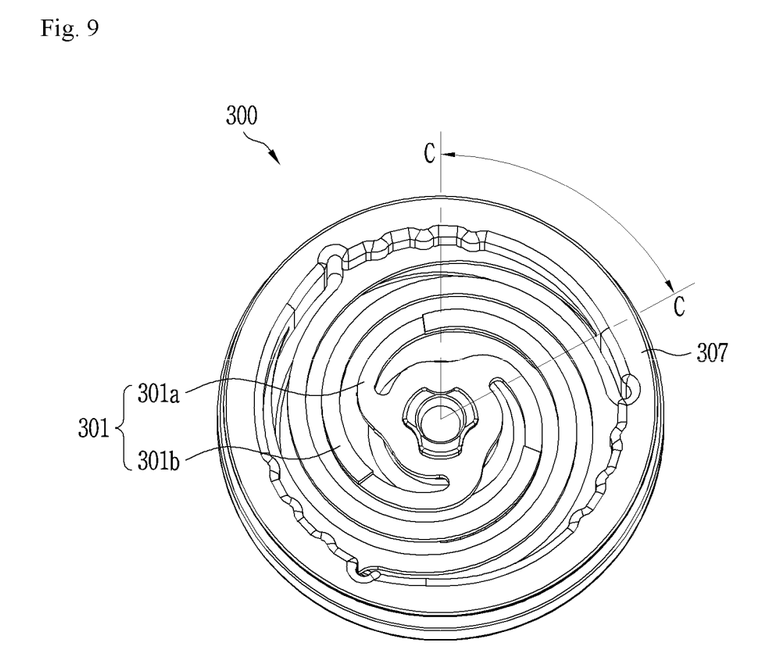
FIG. 9 is a view showing a valve spring of a spring assembly according to an embodiment of the present disclosure.

FIG. 9 is a view showing the valve spring 301 of the spring assembly 300 according to an embodiment of the present disclosure. Specifically, FIG. 9 shows the first spring arm 301a and the second spring arm 301b without the rubber damper 309 (see FIG. 6) which is located at a portion where the first spring arm 301a and the second spring arm 301b overlap each other.

As described above with reference to FIG. 6, the first spring arm 301a may extend in a shape (spiral shape) spaced apart by a predetermined interval from the central portion 303 and cover the central portion 303. A plurality of points at which the first spring arm 301a extends may be formed from the central portion 303 and may be formed to extend from three points at equal intervals. The second spring arm 301b according to an embodiment may be disposed to be spaced apart from the first spring arm 301a by a predetermined interval with respect to the axial direction. The second spring arm 301b may extend in a shape (e.g., spiral shape) covering the central portion 303, while assuming continuity according to the shape of the first spring arm 301a and maintaining a predetermined interval with the first spring arm 301a.

When viewed from above based on the illustrated state of FIG. 9, the valve spring 301 may be recognized as a single valve spring 301. Although the first spring arm 301a and the second spring arm 301b according to an embodiment are separate structures, they need to operate as one valve spring 301. In addition, since the valve spring 301 needs to withstand vibration of the discharge valve 1121 which is repeatedly opened and closed at a high speed, the connection portion needs to be robust.

Therefore, the first spring arm 301a and the second spring arm 301b may require overlapping sections having a predetermined length or greater. However, if the overlapping section is formed to be too long, elasticity of the first spring arm 301a may be substantially reduced, and thus it may be difficult to perform the original role thereof.

Therefore, the valve spring 301 according to an embodiment of the present disclosure may be formed such that a section C-C in which the first spring arm 301a and the second spring arm 301b overlap each other is at least one-third of a length of the extending portion of the first spring arm 301a.

According to various embodiments of the present disclosure, the compressor body or a component of the compressor body is prevented from colliding with the shell and being damaged as a movement range of the compressor body is limited.

According to various embodiments of the present disclosure, the occurrence of noise and vibration may be reduced by preventing transmission of vibration and noise that occur during the repeated opening and closing process of the discharge valve to the discharge cover.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A linear compressor comprising:
   a cylinder that receives a piston and that defines a movement path for the piston;
   a discharge valve that is configured to open and close a side of the cylinder and that defines a compression space for a refrigerant with the piston based on the discharge valve closing the side of the cylinder;
   a valve spring configured to press the discharge valve to close the side of the cylinder; and
   a spring support portion configured to support the valve spring, the spring support portion having an annular shape and including:
      an outer circumferential surface that is coupled to a discharge cover, and
      an inner circumferential surface that is coupled to an outer portion of the valve spring, wherein a receiving space is defined at an inner side of the inner circumferential surface,
   wherein the valve spring comprises:
      a central portion that is connected to the discharge valve;
      the outer portion that is spaced apart from the central portion and disposed radially from the central portion;
      at least one first spring arm that spirally extends from the central portion;
      at least one second spring arm that is spaced apart from the at least one first spring arm in an axial direction of the cylinder, that spirally extends from the outer portion, and that corresponds to a shape of the at least one first spring arm; and
      a rubber damper that connects the at least one first spring arm with the at least one second spring arm and that fixes a position of the at least one first spring arm relative to the at least one second spring arm,
      wherein the first spring arm, the second spring arm, and the rubber damper are disposed in the receiving space.

2. The linear compressor of claim 1, wherein the at least one first spring arm includes a plurality of first spring arms, each first spring arm of the plurality of first spring arms spirally extending from a respective first point of a plurality of first points at the central portion.

3. The linear compressor of claim 2, wherein the plurality of first points are spaced equally from each other.

4. The linear compressor of claim 1, wherein the at least one first spring arm includes a plurality of first spring arms, each first spring arm of the plurality of first spring arms spirally extending from a respective point of at least three first points at the central portion.

5. The linear compressor of claim 4, wherein a section of the at least one second spring arm overlaps at least partially with the at least one first spring arm with respect to the axial direction of the cylinder.

6. The linear compressor of claim 5, wherein the at least one second spring arm comprises a plurality of second spring arms, each second spring arm of the plurality of second spring arms spirally extending from a respective second point of a plurality of second points at the outer portion.

7. The linear compressor of claim 6, wherein the plurality of second points are spaced equally from each other.

8. The linear compressor of claim 7, wherein the plurality of second spring arms are connected to each other and define a circle in the outer portion.

9. The linear compressor of claim 5, wherein the at least one second spring arm is disposed to overlap at least one-third of a length of the at least one first spring arm that extends from the central portion.

10. The linear compressor of claim 1, wherein the at least one second spring arm is located on the outer portion of the valve spring in the radial direction with respect to the central portion.

11. The linear compressor of claim 1, wherein a thickness of the rubber damper in the axial direction is greater than a distance between the at least one first spring arm and the at least one second spring arm in the axial direction.

12. The linear compressor of claim 1, wherein the cylinder has a hollow cylindrical shape.

13. The linear compressor of claim 1, wherein the spring support portion has a ring shape.

14. The linear compressor of claim 1, wherein the spring support portion provides a support point for the valve spring to press the discharge valve to close the side of the cylinder.

15. The linear compressor of claim 1, wherein the at least one second spring arm includes a portion inserted into the inner circumferential surface of the spring support.

16. A linear compressor comprising:
   a cylinder that receives a piston and that defines a movement path for the piston;
   a discharge valve that is configured to open and close a side of the cylinder and that defines a compression space for a refrigerant with the piston based on the discharge valve closing the side of the cylinder;
   a valve spring configured to press the discharge valve to close the side of the cylinder; and
   a spring support portion configured to support the valve spring, the spring support portion including:
      an outer circumferential surface that is coupled to a discharge cover, and
      an inner circumferential surface that is coupled to an outer portion of the valve spring,
   wherein the valve spring comprises:
      a central portion that is connected to the discharge valve;
      the outer portion that is spaced apart from the central portion and disposed radially from the central portion;
      at least one first spring arm that spirally extends from the central portion;
      at least one second spring arm that is spaced apart from the at least one first spring arm in an axial direction of the cylinder, that spirally extends from the outer portion, and that corresponds to a shape of the at least one first spring arm; and
      a rubber damper that connects the at least one first spring arm with the at least one second spring arm and that fixes a position of the at least one first spring arm relative to the at least one second spring arm, wherein a section of the at least one second spring arm overlaps at least partially with the at least one first spring arm with respect to the axial direction of the cylinder, and wherein the rubber damper has a spiral shape that is disposed along the shape of the at least one first spring arm from the central portion.

17. The linear compressor of claim 16, wherein the at least one first spring arm includes a plurality of first spring arms, each first spring arm of the plurality of first spring arms spirally extending from a respective first point of at least three first points at the central portion.

18. The linear compressor of claim 16, wherein the at least one second spring arm comprises a plurality of second spring arms, each second spring arm of the plurality of second spring arms spirally extending from a respective second point of a plurality of second points at the outer portion.

19. The linear compressor of claim 16, wherein the rubber damper covers the section in which the at least one first spring arm and the at least one second spring arm overlap with each other with respect to the axial direction of the cylinder.

20. The linear compressor of claim 16, wherein the rubber damper is dual injection molded with the at least one first spring arm and the at least one second spring arm.

21. A linear compressor comprising:
a cylinder that receives a piston and that defines a movement path for the piston;
a discharge valve that is configured to open and close a side of the cylinder and that defines a compression space for a refrigerant with the piston based on the discharge valve closing the side of the cylinder;
a valve spring configured to press the discharge valve to close the side of the cylinder; and
a spring support portion configured to support the valve spring, the spring support portion including:
an outer circumferential surface that is coupled to a discharge cover, and
an inner circumferential surface that is coupled to an outer portion of the valve spring,
wherein the valve spring comprises:
a central portion that is connected to the discharge valve;
the outer portion that is spaced apart from the central portion and disposed radially from the central portion;
at least one first spring arm that spirally extends from the central portion;
at least one second spring arm that is spaced apart from the at least one first spring arm in an axial direction of the cylinder, that spirally extends from the outer portion, and that corresponds to a shape of the at least one first spring arm; and
a rubber damper that connects the at least one first spring arm with the at least one second spring arm and that fixes a position of the at least one first spring arm relative to the at least one second spring arm,
wherein the spring support portion includes a recess at the outer circumferential surface of the spring support portion, wherein the recess is disposed to face the discharge cover and receives a rubber ring.

22. The linear compressor of claim 21, wherein the outer portion is connected as a circle and is inserted into and coupled to an inner circumferential surface of the spring support portion.

23. The linear compressor of claim 22, wherein the rubber ring contacts the discharge cover, and wherein the outer circumferential surface of the spring support portion is spaced apart from the discharge cover.

* * * * *